United States Patent
Miller (10) Patent No.: US 10,737,260 B2
(45) Date of Patent: Aug. 11, 2020

(54) SYSTEM AND METHOD FOR RESTORING KINETIC PROPERTIES OF RESIN

(71) Applicant: Thomas O. Miller, Peoria, AZ (US)

(72) Inventor: Thomas O. Miller, Peoria, AZ (US)

(73) Assignee: Ionx Solutions, LLC, Glendale, AZ (US)

(*) Notice: Subject to any disclaimer, the term of this patent is extended or adjusted under 35 U.S.C. 154(b) by 0 days.

(21) Appl. No.: 16/676,128

(22) Filed: Nov. 6, 2019

(65) Prior Publication Data

US 2020/0070143 A1  Mar. 5, 2020

Related U.S. Application Data

(63) Continuation of application No. 16/292,131, filed on Mar. 4, 2019, now Pat. No. 10,532,351.

(60) Provisional application No. 62/724,587, filed on Aug. 29, 2018.

(51) Int. Cl.
| | |
|---|---|
| B01J 49/70 | (2017.01) |
| B01J 49/57 | (2017.01) |
| B01J 49/53 | (2017.01) |
| B01J 49/60 | (2017.01) |

(52) U.S. Cl.
CPC .......... *B01J 49/70* (2017.01); *B01J 49/53* (2017.01); *B01J 49/57* (2017.01); *B01J 49/60* (2017.01)

(58) Field of Classification Search
CPC ... B01J 49/70; B01J 49/57; B01J 49/53; B01J 49/60
USPC ............................................................ 521/26
See application file for complete search history.

(56) References Cited

U.S. PATENT DOCUMENTS

| | | | | | |
|---|---|---|---|---|---|
| 3,749,249 | A | * | 7/1973 | Ryan | B01J 49/05 210/268 |
| 4,880,513 | A | * | 11/1989 | Davis | B01D 61/445 204/519 |
| 5,368,818 | A | * | 11/1994 | Cummings | B01J 39/04 204/422 |

FOREIGN PATENT DOCUMENTS

| | | | | | |
|---|---|---|---|---|---|
| JP | 2013139028 | A | * | 7/2013 | |
| JP | 2016093779 | A | * | 5/2016 | B01J 49/00 |

* cited by examiner

*Primary Examiner* — Michael Bernshteyn
(74) *Attorney, Agent, or Firm* — Rodney J. Fuller; Booth Udall Fuller, PLC (57) ABSTRACT

A system and method configured to restore ion exchange kinetic properties and purify resin is described. Degraded ion exchange kinetic properties of anion resin will eventually result in impurity slippage through resin charges. This system and method employs an acid catalyst in combination with sulfite cleaning solution to remove organic material and to protonate iron oxides for deconstruction and removal from anion resins. The cleaning solution, when applied via a cleaning vessel utilizing an eductor(s)/plenum and wedge-wire screen draw chamber, while controlling all phases of cleaning by electronic monitoring, yields complete restoration of ion exchange kinetics on usable resin. As such, the system and method provides a safe, effective, and vastly improved method for restoring anion resin kinetics and improving regeneration quality, for improved resin performance and minimizing resin replacement costs.

7 Claims, 6 Drawing Sheets

SYSTEM AND METHOD FOR RESTORING KINETIC PROPERTIES OF RESIN

CONTINUITY

This application is a continuation application of non-provisional application Ser. No. 16/292,131, filed on Mar. 4, 2019, and of provisional patent application No. 62/724,587, filed on Aug. 29, 2018, and priority is claimed thereto.

FIELD OF THE PRESENT INVENTION

The present invention relates to the field of cleansing and purifying ion exchange resins, and more specifically relates to a system and method by which resins, such as ion exchange resin, may be cleaned of impurities and regenerated in a expeditious and efficient manner, and kinetics of the ion exchange resin are fully restored.

BACKGROUND OF THE PRESENT INVENTION

It is known that power plants and other industries utilize ion exchange resins to purify water used in producing steam. The rate at which ion exchange occurs at exchange sites on resin is referred to as ion exchange kinetics, and is expressed as the mass transfer coefficient (MTC), or the speed at which an exchange site on a resin bead removes ionic impurities from service water through polar attraction. Excellent resin kinetics implies the resin is able to attract and remove impurities before the water carries them past ion exchange sites, and can be summarized as, "The better the kinetic properties are on resin, the higher the quality of effluent waters it will produce." Organic materials and iron oxides adhering to the surface of resins can block exchange sites, slowing the ability of the resin to attract and remove impurities. Blocking exchange sites on resin surfaces results in higher levels of impurities remaining in effluent waters.

To control corrosion rates in plant equipment, the power industry elevates the pH of process waters with various organic amines. Organic additives chemically break down in regions of high temperatures. The resulting decomposition products are captured on surfaces of ion exchange resins, causing the resins to become fouled.

It has recently been determined that decomposition products of pH control additives such as Monoethanolamine (ETA/MEA) are captured on resins as both, positively and negatively charged anions, resulting in ETA/MEA organic complexes. Current resin regeneration processes are unable to effectively remove anionic ETA, or organic and iron oxide foulants from resin surfaces, rendering anion resins incapable of performing ion exchange. Degraded kinetic properties due to organic fouling, results in increased chloride, sulfate and silica slippage from ion exchangers during service runs. Impurities in industrial feedwaters challenge chemistry goals designed to minimize corrosion. Typically, kinetically fouled resin must be removed from service, discarded, and replaced with new. The system and method of this invention removes undesirable foulants from the surface of resins, enabling extended life spans for resin.

Replacing resin charges is extremely costly, and if discarded resin is contaminated with detectible isotopic activity (nuclear power) the cost to bury as radwaste significantly increases replacement costs. Previously, no known acceptably safe or effective method has existed for removing organic fouling and iron oxides from the surface of resin beads. The system and method of this invention efficiently cleans and restores resin ion exchange kinetics by removing all organic materials, resin surface-loaded iron oxides, resin fines, suspended iron oxides, with regenerations that provide final rinse qualities exceeding the levels of new resins.

The increasing demands in the utility sector to lower feedwater impurities as a result of resin maintenance activities are well documented gaps in maintaining health and readiness of condensate polishing resins. Conventional regeneration methods are unable to maintain ion exchange kinetics on polisher resins. Uncommon innovations have been integrated into the system and method of this invention to effectively remove resin fines, suspended and attached iron, and organic/organometallic materials from resins. Additionally, this invention facilitates removal of radioactive material from waste nuclear resins, to levels allowing release as landfill grade waste.

Few solutions to this issue can be found in prior art. For example, sodium bisulfite has been proposed as a solution for removing rust from water softeners, as taught by Hatch (U.S. Pat. No. 3,139,401), however the solution lacks the efficacy and simplicity of the system and method of the present invention. Other resin regeneration chemicals have been previously patented for their anion/cation resin separation properties, but the scope of the application as taught by Auerswald (U.S. Pat. No. 4,511,675) is limited.

SUMMARY OF THE PRESENT INVENTION

The objective of the present invention is to provide a safe, and more efficient method to clean and regenerate resins, by restoring degraded resin ion exchange kinetics to ultimately extend the resin lifespan.

The present invention was devised to clean and restore degraded ion exchange kinetic properties of water treatment resins, by utilizing a sulfite reducing solution (15) catalyzed with acid. If required, cation and anion resins are able to be separated for the cleaning evolution utilizing a specific chemical density that is complimentary to each separate density of cation and anion resins. When suspended in a specific chemical, resins will separate based on respective resin densities. Alternatively, mechanical means may be employed to separate each of the two resin species by size or density, if the cleaning process so dictates. Cation and anion resins require specific regenerant chemicals, requiring isolation specific to cation or anion resin, which may be accomplished pre or post-cleaning. Regeneration of resins occur only after resins have been physically and/or chemically cleaned.

The system and method of this invention employs a certain cleaning and regeneration vessel, whether vertical (45) or horizontal (50), which utilize unique properties of a wedge-wire draw chamber (55) and a central transfer eductor/plenum (60, 65) or similar apparatus. Fouled resins are drawn from the floor of the vessel draw chamber (55) and delivered to the top of the resin charge using an eductor/plenum (60, 65) and catalyzed reducing solution (15). High quality regenerations following the cleaning cycles, described in this invention can be performed in a single cleaning/regeneration vessel (45)(50). Monitoring process chemical reactions at various locations throughout the cleaning/regeneration vessel (45)(50) provides quantitative sentience of process status. High quality final regeneration rinse end-points are made achievable through applying diffusion-shifted displacement (90) rinse techniques.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a system and method for the purification and cleansing of resins and resin surfaces in order to restore resin kinetics (mass transfer coefficient—MTC) and ion exchange functionality. When a bisulfite solution is buffered with an acid solution to the pH range of 3.0-5.0, anionic organic and protonated organometallic complexes efficaciously detach from anion resin surfaces. For the purposes of this application, this combined solution is referred to as the cleaning solution (15). When organic materials are removed from resin surfaces, ion exchange functionality (kinetics) is restored, allowing resin to perform as designed. Following exposure to the cleaning solution (15), ion exchange sites are fully exhausted and require multiple regenerations with concentrated acid or caustic solutions to fully restore ion exchange capacities. Periodic sulfite cleanings bolster resin health initiatives and maintenance programs by eliminating cumulative negative effects of organic impairment on resins.

Figure 1:
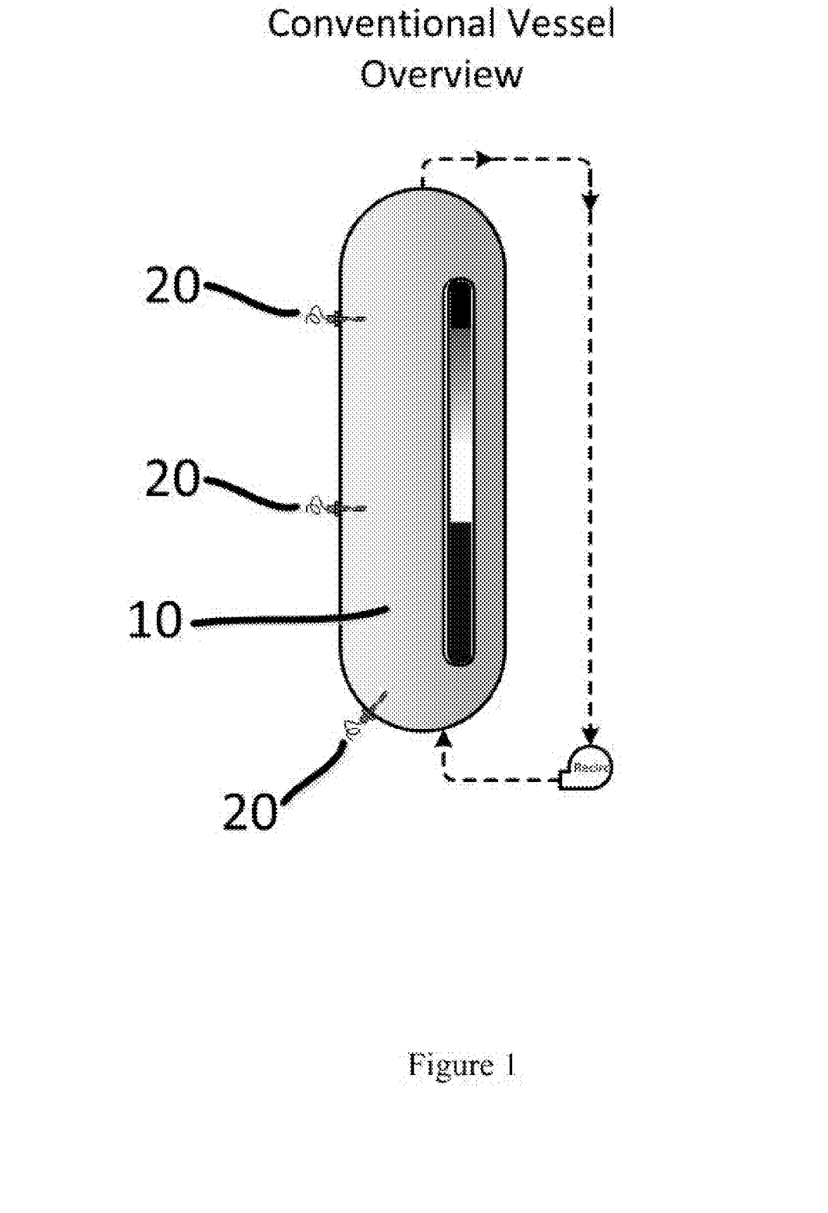
FIG. 1 depicts an overview perspective of a conventional cleaning vessel (10) and cleaning vessels employed in the process and system of the present invention (45)(50).
Figure 2:
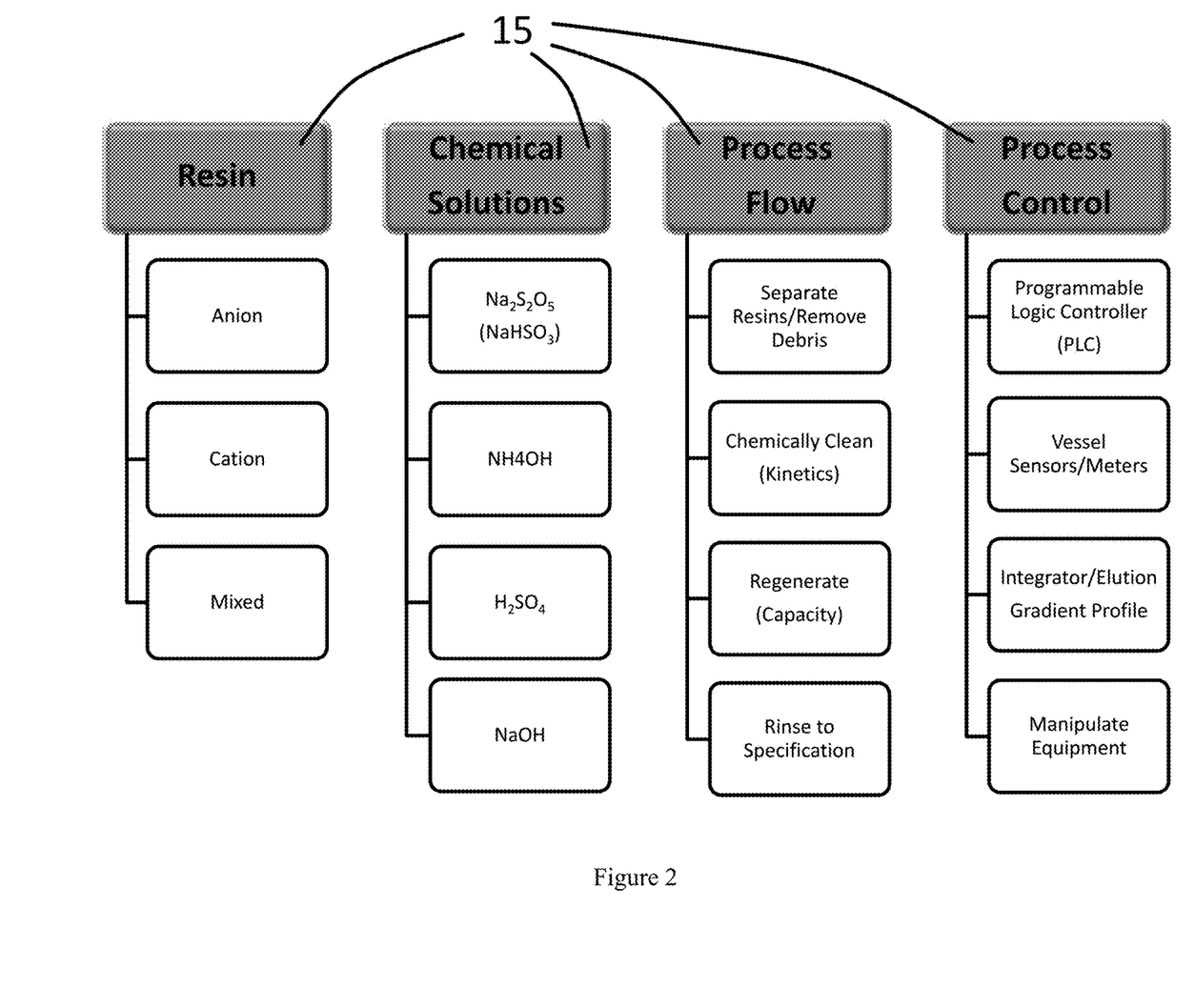
FIG. 2 depicts a flow chart of major components of the cleaning process, Resin, Chemical Solutions, Process Flow, and Process Control of use of the method of the present invention for restoring resin kinetics.
Figure 3:
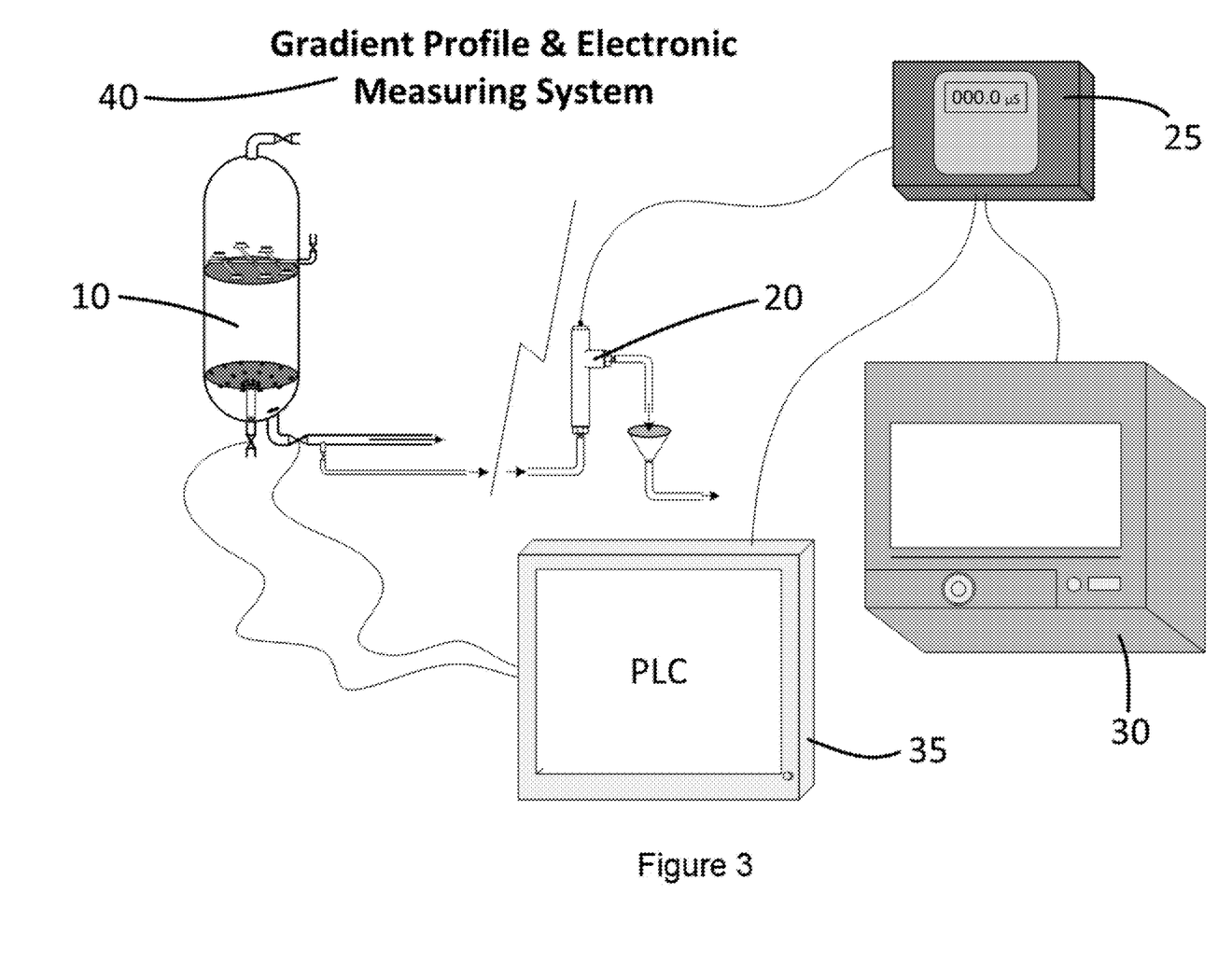
FIG. 3 exhibits a view of Electronic Monitoring System (40) associated with the method and system of the present invention, depicted in use of Resin Elution Gradient (40) Profiles.
Figure 4:
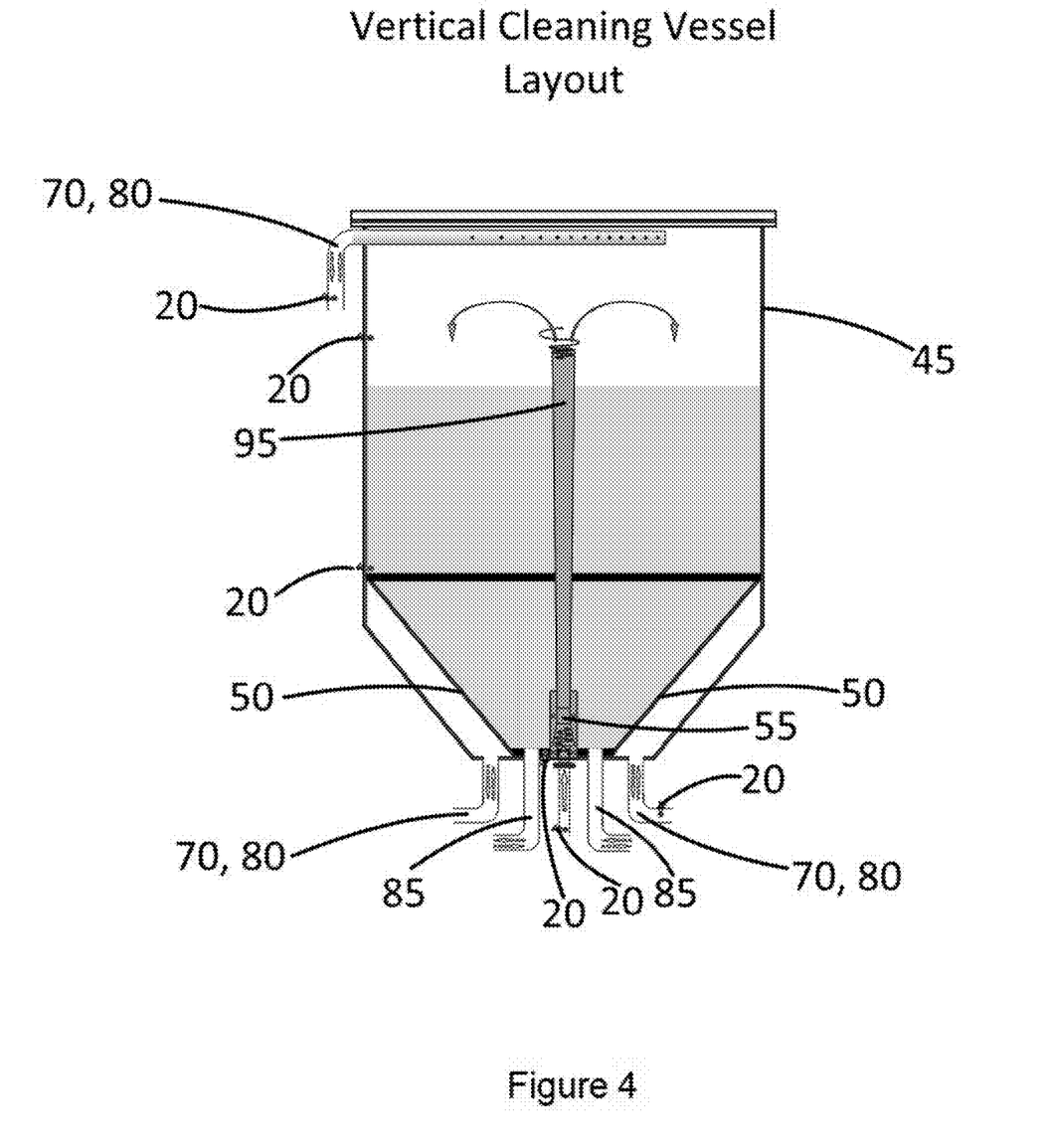
FIG. 4 shows a cross-sectional view of the Vertical Cleaning Vessel Layout (45) employed in the method and system of the present invention.
Figure 5:
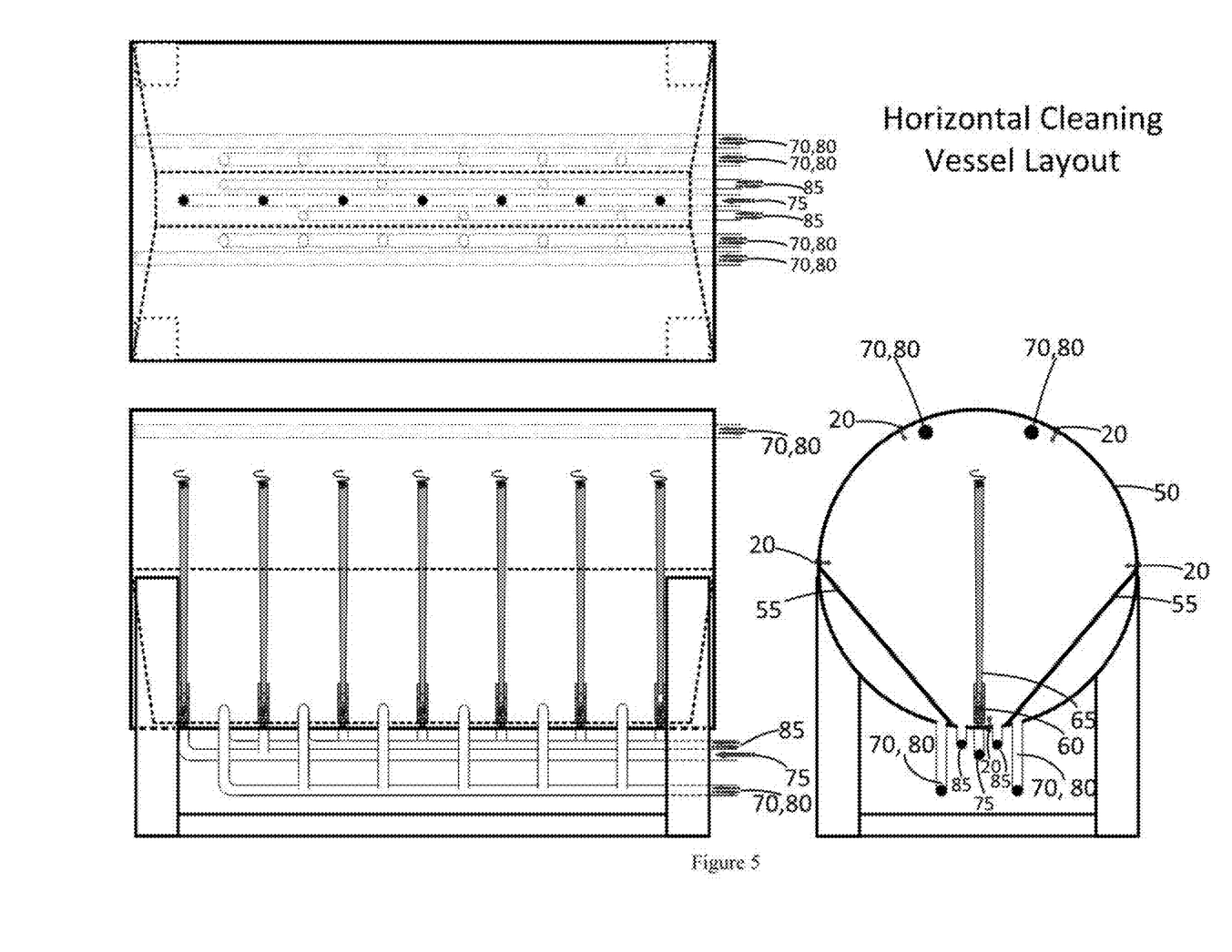
FIG. 5 shows a cross-sectional view of a suggested Horizontal Cleaning Vessel (50) employed in the method and system of the present invention.
Figure 6:
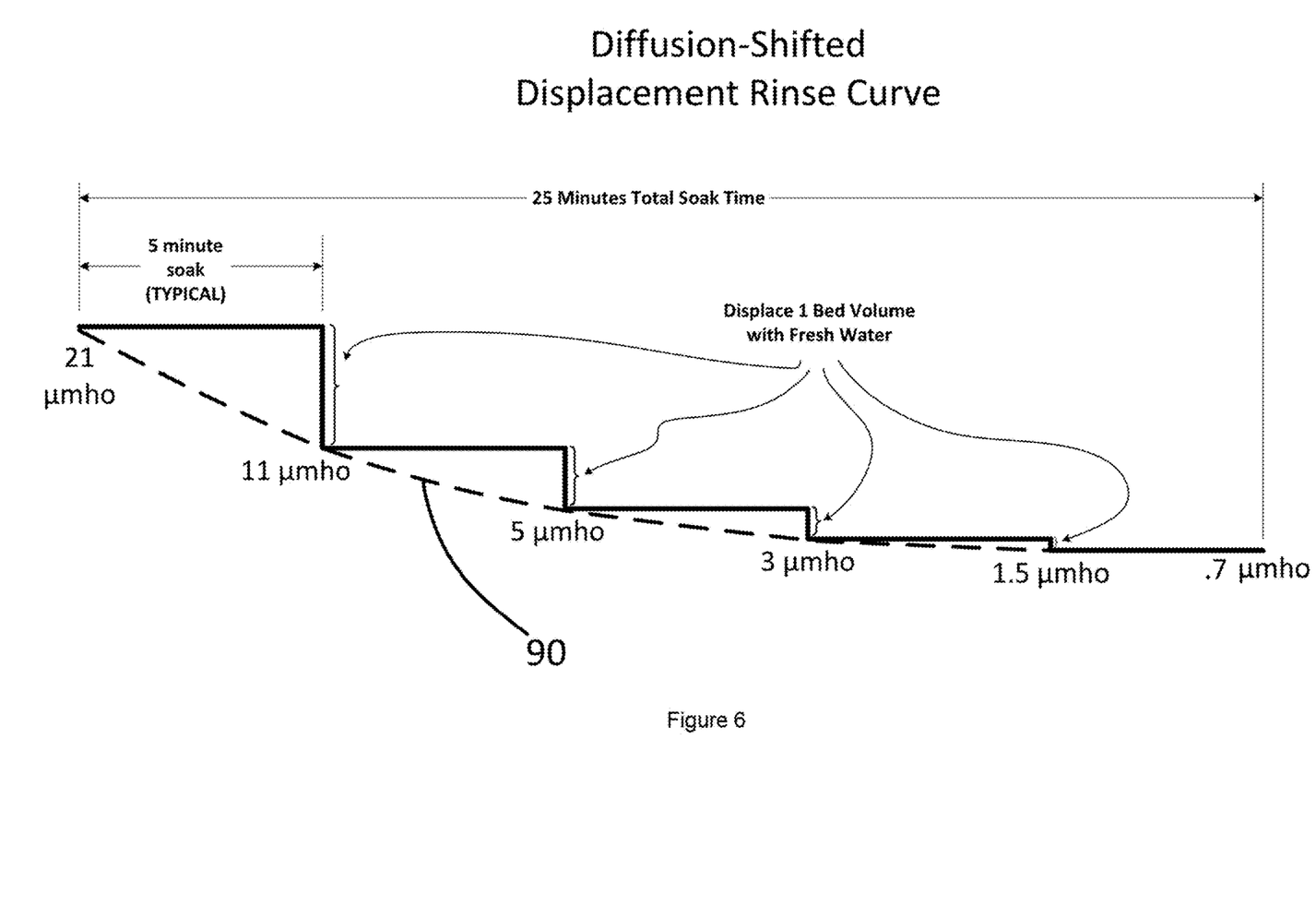
FIG. 6 illustrates a diffusion-shifted displacement (90) approach to final rinses of the method and system of the present invention.

The method of the present invention employs at least one vessel (10)(45)(50) as disclosed in FIGS. 1-6, to facilitate the restoration of the kinetic properties of the resin. A primary benefit of the system and method of the present invention is that multiple chemical processes typically requiring use of three or more separate vessels, have been combined into a single multi-use vessel (45)(50). This newly designed vessel (45)(50), when combined with sulfite reducing chemical, removes resin fines, suspended iron and debris, restores kinetics, regenerates, and rinses resin to specifications rarely achievable with currently regeneration processes. As such, the method of the present invention is accomplished via use of a multi-use cleaning vessel (45)(50), containing a central eductor/plenum (60, 65), wedge-wire screen draw-chamber (55), sulfite/catalyst reducing solution (15), an electronic monitoring and control system (40), and a diffusion-shifted displacement (90) final rinse process.

Benefits and strengths of the present invention may include, but are not limited to:
1. Noncombustible and nonflammable sulfite/catalyst reducing chemical.
2. Maintains chemical compatibility with rubber linings and stainless-steel alloys.
3. Cation complimentary as a cation bisulfite, ammonium bisulfite.
4. Chemical reactions are monitored real-time during the cleaning, regeneration, and rinsing process (elution gradient (40) profiling).
5. Diffusion-shifted displacement (90) rinse techniques drive lowered final rinse end-points.
6. Central eductor/plenum (60, 65) drawing of resin from off the bottom of cleaning vessel (45)(50), depositing on top of the resin charge, when in contact with cleaning and regenerant chemicals.
7. Continuous resin and chemical recirculation.
8. Requires less than 10% of current processes regeneration chemicals.
9. Generates less than 10% of regeneration wastes of current processes.

The eductor/plenum (60, 65) of the present invention is preferably an off-the-shelf item which can therefore be sized and purchased specifically for vessel (45, 50) size. Eductor (60) sizing for total resin volume transport capability is determined by vessel (45)(50) size, system pressures, gpm of eductor (60) motive solution, and desired total cubic feet of resin to be drawn per unit of time. Per convention, the eductor (60) of the present invention is used to facilitate mixing and contact time of chemical with resin and provides motive solution for direct transfer of resin from vessel bottom to vessel top. The eductor/plenum (60, 65) of the present invention is equipped with potentially a variable-flare extension extending to above the upper level of resin. The flared extension plenum (65) of the eductor (60) is configured to provide a direct transfer path for depositing resin on the top of the resin charge, from the bottom of the vessel draw chamber (55). Flow paths of the present invention includes resin drawn from off the floor of the vessel draw chamber (55), transporting the resin & solution (15) upward through the plenum (65) to exit the plenum (65) and settle as the top layer of resin. The main function of the eductor/plenum (60, 65) is to draw resin & solution (15) from the vessel bottom, and to provide a direct pathway to the top of the resin charge. During the transfer process, the upper layer of resin is drawn downward through the vessel and into the wedge-wire draw chamber (55) until it reaches the bottom of the draw chamber. Once there, the eductor (60)

draws it from the floor bottom to push it upwards through the plenum (65). Inside the eductor (60), the resin and cleaning/regeneration solutions (15) are mixed via vortex flow motion, travelling up the plenum (65) and exiting onto the top of the resin charge. This flow path is performed continuously until the resin is clean or requires regeneration. Regeneration and rinse flows are identical to the path of the cleaning chemical.

This resin transfer and circulation process within the vessel (45)(50) of the present invention is in contrast to conventional resin cleaning/regeneration vessels in which cleaning and regeneration chemicals are forced through compacted resins. Conventional regeneration methods move chemical through a motionless resin bed. In such cleaning/regeneration vessels, frequent issues associated with high/low flow regions within the cleaning vessel, and flow anomalies that are a result of various pendant transport headers designed into the vessel, require skilled troubleshooting and constant attention to the process. The use of an eductor (60) utilizing an extended discharge plenum (65) in the system of the present invention resolves issues associated with conventional regeneration vessels, such as low-flow regions, header induced flow anomalies, and regions of residual chemical hide-out.

A critical attribute relating to the efficacy of the system and method of the present invention is the ability to monitor and control chemicals and reactions on resins during all phases of the cleaning, regeneration, and rinse processes. Use of an electronic monitoring and control system (40), precisely configured within the vessel (45)(50), monitors resin and chemical reactions throughout the cleaning, regeneration, and final rinse processes of the system.

Chemical monitoring is achieved via the use of strategically positioned conductivity/toroidal sensors (20), pH sensors, temperature sensors, sodium instrumentation and other electronic means (40), of securing process information. Data received from electronic sensors (20) is collected by a data logger/integrator (30), used to develop elution gradient (40) profiles during each step of the cleaning, regeneration, and rinse process. The data set, when displayed graphically, produces unique elution gradient (40) profiles representing conductivity, pH, concentrations, and various other chemistry constituents, per unit time. The elution Gradient (40) profile, of the electronic monitoring system (40), provides graphic representation of process data for conducting forensic analysis, and is extremely valuable when attempting to interpret process anomalies.

Intended use of the electronic monitoring (40) data of the present invention is to provide insights for revising process parameters, step times, chemical concentrations, process termination, etc. Gradient profiles act as baselines for comparing performance shifts, trending and predictive analyses. Recommended strategic placement of these elements of the electronic monitoring and control system (40) of the present invention can be seen in FIG. 1.

Baseline curves of the results provided by the electronic monitoring and control system (40) are initially derived by processing each newly purchased resin charge prior to being placed into service. Cleaning and regeneration data of newly purchased resin charges provides insight to baseline data of virgin resin prior to contamination, and can be used for predictive trending of resin degradation over time. As such, subsequent cleaning and regeneration activities performed by the system of the present invention on aging resins relies on baseline data (curves) and end-points as a model for anticipating and achieving completion of each step of the cleaning and regenerating process. Data loggers (30) gather real-time data during each separate phase, permitting real-time and forensic evaluation of the data upon completion of the cleaning and regeneration process. This becomes very useful in the event that programmed steps for cleaning times, flow rates, or chemical concentrations fail to clean, recover, regenerate, or rinse resins to acceptable quality as expected.

Benefits of performing an initial regeneration elution gradient (40) profile on newly purchased resins with this system and method of the present invention are twofold; firstly, it removes residual organic sulfonates that remain on new cation resins due to the manufacturing process, which is known to severely degrade anion resins; secondly, it establishes baseline information of a newly purchased resin charge, which is used to compare future cleaning and regeneration data against as the resin degrades with time and use. Baseline data allows qualitative and quantitative adjustments to the cleaning and regeneration processes to account for degrading trends. Comparing future regeneration data to the original baseline data permits the user to develop requisite cleaning and regeneration strategies to address minor shifts in performance, before degradation is irreparable, resulting in uninhibited impurity throw. Electronic monitoring of the system (40) and method of the present invention arms the user with evidence of deficient parameters, such as inconsistent chemical concentrations, inadequate injection times, or grossly extended rinse times. Modifications to the process can be made to make minor adjustments for maintaining a high-quality effluent. The ability to observe and trend minor shifts in physical and/or chemical attrition during performance of cleaning or regenerating resins, is currently unavailable.

Output from electronic monitoring instrumentation chemistry meters (25), employed in the electronic monitoring and control system (40) of the present invention is configured to interface with a Programmable Logic Controller (PLC) (35) per convention, to provide controller feedback from which the PLC (35) can respond to process parameters. The PLC (35) can adjust system pumps, valves, repeat sequences, alter step times and concentrations, etc. during process execution. The system is preferably configured to automatically make adjustments to certain predefined parameters as required, based on feedback received from the electronic monitoring system (40).

For example: if pH of the cleaning solution trends downward in one section of the vessel (45)(50) from an adjacent section (as indicated by a corresponding drop in pH readouts) the system responds by adjusting feed valves slightly more open to allow additional cleaning chemical/acid solution (15) until pH has recovered and is being maintained in the desired range. The PLC (35) receives output signals from Toroidal (conductivity), pH, flow, Temperature, and sodium instrumentation (20). As the PLC (35) receives process data, it will generate appropriate control signals to system parameters. Built-in step timers control times and sequences to process resins with the correct chemical concentrations to recover kinetics and ion exchange capacities. Data loggers & integrators (30) record output data (temp, conductivity, pH, dates/times, flow rates, chemical concentrations, etc.) for real-time and forensic evaluation of the process.

The electronic monitoring and control system (40) of the present invention acts as a go/no-go tool during regeneration. If 16% regenerant is being injected onto resin during a regeneration, eventually the waste stream will also reach 16% concentration as the resin becomes fully regenerated, and chemical demand has ceased. The operator can terminate the injection step, even though additional time has been allocated and programmed for this step. Continuing the injection of caustic in those conditions results in wasted chemical, and creates unnecessary waste volumes to neutralize and disposition. Likewise, if the waste stream is measuring only 10% concentration when the step time has expired, and 16% is being injected, the user would certainly extend the injection step until the resin's chemical demand has been satisfied, as indicated by 16% concentration of caustic in the waste stream. If resin chemical demand is not satisfied during the regeneration process, short run times and potential ionic leakage can occur. Real-time data arms the user with previously unavailable insights that quantifiably justify operator intervention when needed. As the data logger (30) collects and processes data for graphic display, the PLC (35) responds to automatic feedback of system parameters to actuate valves and pumps. Touch screen displays which are part of the PLC (35), provide operators with a human-machine-interface (HMI) for over-ride control when required.

Experimental Results

Ammonium sulfite monohydrate can be dissolved in water or metabisulfite can be purchased in liquid form at desired concentrations below 70% to prepare the cleaning solution (15). Impure liquid bisulfite solutions containing stabilizers such as potassium hydroxide, sodium carbonate, or other commercial preservatives, exhibited impaired cleaning capabilities during testing. Concentrated bisulfate solutions in the liquid form must be free from all manufacturing stabilizers to perform effective organic and iron removal.

The cleaning process effectively cleans resin in any state of exhaustion. Cleaning cation and anion resins in the mixed state seemed to have no adverse impacts, although anion and cation resins must be separated prior to post-cleaning regeneration.

For efficient resin cleaning, specific gravity/density and pH of the cleaning solution (15) must be maintained. Specific gravities of ~1.40 were required to allow exhausted cation resins to settle, and specific gravities of ~1.10 were required to float exhausted anion resin, although different levels of organic or iron fouling contributed to additional density of used resins. When resins became super-saturated with ammonia and sulfate, resin densities increased, requiring adjustments to strengthen chemical concentrations. When anion resin became super saturated with sulfate that was converted from sulfite during the cleaning process, it was noted that the resin required several cycles of cleaning and regenerations to fully remove iron compounds that had been complexed with hydroxide during prior regenerations. If resin was severely fouled with surface iron, several cleaning/regeneration cycles were required to remove the surface iron. Significant kinetic restoration was consistently found to occur after only a single cleaning cycle followed by dual regenerations, which is positive news if ion exchange kinetics are the focus of resin cleaning. If 100% iron removal is the goal, several cleaning and regeneration cycles via use of the system and method of the present invention are needed.

If resin is cleaned as a mixed bed, they must eventually be separated to enable individual cation and anion regenerations. Chemical byproducts that are produced by the cleaning process include a small amount of sulfur dioxide fumes, water, and ammonium sulfate waste. As the sulfite/catalyst solution (15) protonates iron oxides, the sulfite is converted to sulfate, altering pH, conductivity, and density of the cleaning solution (15). Close scrutiny of system parameters is vital for maintaining proper cleaning solution (15) concentrations during the cleaning process to ensure efficiencies are maintained and organic and iron foulants are deconstructed.

Extreme care should be taken to minimize contact of ambient or other sources of free oxygen with the sulfite cleaning solution (15), as available oxygen will be immediately consumed by the cleaning solution (15), converting available ammonium sulfite to ammonium sulfate, and decreasing iron reducing properties of the cleaning solution (15).

Anion resins having significant kinetic impairment due to iron, required additional contact time (cleaning & regeneration cycles) with sulfite/catalyst cleaning solution (15) to remove the majority of iron.

Laboratory experiments showed that consistent ion exchange kinetic recoveries were achieved with concentrations ranging from ~2.0%-40.0% ammonium bisulfite solutions (15), catalyzed with ~0.5%-2.0% sulfuric acid concentrations.

Restoration of resin ion exchange capacity is required after fully exhausting during cleaning, and requires a minimum of two regenerations at manufacturer recommended regenerant dosages. Prior to post/cleaning regenerations, all residual cleaning solution must be thoroughly rinsed from the exhausted anion resins to avoid thermal damage of resin surfaces that can result due to exothermic reactions of the low pH cleaning solution (15) and caustic regenerant.

During the testing process, a 2N sodium hydroxide regenerant solution was used to regenerate anion resin to full ion exchange capacity, increasing anion resin kinetics from 1.4-1.6×10E-4 m/s, to greater than 2.0×10E-4 m/s (MTC). No adverse effects have been noted on resins resulting from the present invention. Regeneration of newly purchased resin is highly recommended prior to first use.

Referring to FIGS. 1-6, use of the process, method and system of the present invention is preferably as follows:

A. Chemical—the cleaning solution (15)
  1. Sulfite (SO3) reducer (ammonium bisulfite or similar)
  2. Acid (H2SO4) catalyst (sulfuric acid or similar)
B. Recirculation eductor/plenum: (60, 65)
  1. Off-the-shelf eductor (60) purchased)
  2. Extended plenum (65) (purchased/fabricated)
  3. Increased contact time (resin & chemical)
  4. Recirculation method (resin drawn from bottom & deposited on top)
  5. Complete resin ion exchange kinetics recovery (as-new condition)
  6. High quality resin regeneration (100%)
  7. Extremely high quality rinse end-point (<1.0 µS)
  8. Less than 10% of normal chemical usage (~7%)
  9. Less than 10% of normal time to regenerate
  10. Less than 10% of normal waste stream volumes generated
C. Wedge-wire draw-chamber: (55)
  1. Off-the-shelf, order to build, resin screen (purchased) (55)
  2. Forced resin, eductor (60) draw
D. Automated elution gradient profile: (40)
  1. Electronic chemical process measurement during each phase
  2. Go/no-go tool for process termination/extension
  3. Forensic evaluation of cleaning, regeneration & rinse processes
E. Diffusion-shifted Displacement rinse end-points: (90)
  1. Significant rinse water & waste volume reductions
  2. Significant time reduction F. Device Identification Reference Numbers:
- 10 Conventional cleaning vessel
- 15 Cleaning Process, including resin types, chemicals used, four cleaning phases, electronic monitoring control system
- 20 Electronic measurement probes of various nature, including pH, conductivity/toroidal, temperature, concentration, flow rate (gpm), etc.
- 25 Chemistry meters
- 30 Digital Integrator/Data Logger
- 35 Programmable Logic Controller (PLC)
- 40 Electronic Monitoring System—Elution Gradient Profiling (data graphing)
- 45 Vertical Cleaning Vessel
- 50 Horizontal Cleaning Vessel
- 55 Wedge-wire Screens Draw Chamber
- 60 Eductor
- 65 Plenum
- 70 Chemical & Water inlet
- 75 Eductor Motive Feed, Chemical/Water
- 80 Waste Outlet
- 85 Resin Inlet/Outlet
- 90 Diffusion-Shifted Displacement It should be understood that the singular vessel (45)(50) of the present invention containing, eductor(s) (60), plenum (65), wedge-wire screens (55), and electronic monitoring system (40), are to be utilized during fines removal, entrained iron removal, kinetics recovery, and resin regeneration/rinse processes. Similarly, it should be noted that the vessel (45)(50) of the present invention, is sealed or pressurized with water and/or cleaning solution (15) when performing ion exchange kinetics recovery steps utilizing cleaning/reducing agents composed in part of sulfite. On contact with available free oxygen, cleaning/reducing solutions convert from sulfite to sulfate, reducing its efficacy to deconstruct long-chain organic material or iron oxides.

Post cleaning regenerations are required to reactivate ion exchange sites on resin surfaces. Final rinses can tally many thousands of gallons and hours of rinsing to achieve rinse end-point goals, usually in the range of <0.080 which is very close to pure water (0.055 µS). Many times, resins exhibiting fouling or impaired kinetics will never reach desired rinse end-points or flow anomalies exist within the resin vessel (45)(50) that inhibit effective hydraulic conditions for reaching high quality rinse end-points. Rinse conductivities will often rinse down to approximately 10-15 µS and then level off and refuse to rinse down any further.

A method for achieving extremely low final rinse end-points has been developed as part of the system and method of the present invention, that exploits mass transfer properties of physics to achieve excellent rinse end-point conductivities. Residual regenerant chemicals captured inside surface crevices of resins during regenerations, will experience difficulty "rinsing" out of resin surface micro-crevices due to hydraulic pressures on resin surfaces associated with high-rate flows during fast rinses. To effectively remove these crevice contaminants, flow should be terminated. For example, short soak periods of five minutes or so, allows concentrated impurities held inside crevices to naturally diffuse out of the crevice and into interstitial waters surrounding the resin.

Natural diffusion always flows from high concentration to low concentration. Equilibria is reached relatively quickly as interstitial waters become saturated to that of the surfaces inside crevices, essentially stopping the diffusion process. When contaminant concentrations become equal between crevice surfaces, and the surrounding interstitial waters, displace (to waste) one bed volume of de-ionized (DI) water from the resin charge. As fresh DI water replaces the contaminated water for another soak, the diffusion process begins again, moving from crevices to surrounding waters until contaminant levels inside crevices are low enough to produce the desired final rinse end-points.

A series of soaks followed by single-bed-volume displacements have been shown to save substantial amounts of DI water, eliminating unnecessary hours spent rinsing. Depending on relative conductivity starting points of the diffusion-shifted displacements (90), each displacement may yield up to 50% reduced contaminant levels as rinse conductivities decrease.

Soak times can be altered. After several soak steps have been performed, and crevice contamination levels have decreased, longer soak times may yield greater impurity removal, due to weakened diffusion driving force due to lowered concentrations of impurities remaining inside crevices. Highly concentrated crevices quickly saturate surrounding waters, halting the diffusion process until it is replaced with fresh DI water. Typically, shorter soak times are required initially, with longer soak times needed towards final displacement end-point conductivities are achieved.

In short, it should be noted that the process of the present invention using the vessel of the present invention is preferably as follows: first, obtain spent resin. Then, the spent resin is introduced to the vessel (45, 50), the vessel contains a sulfite reducing chemical cleaning solution (15), as well as a sulfuric acid for the regeneration of cation resins, and sodium hydroxide for the regeneration of anion resins. The cleaning solutions (15), including the regenerants as well as flush waters are preferably configured to flow bi-directionally thorough at least one wedge-wire screen to facilitate cleaning and regeneration of the resins. Further, the resins are contained and channeled within a wedge-wire screen draw chamber (55) as the resin is pulled towards the bottom of the vessel (45, 50) via an eductor. The wedge-wire screen draw chamber (55) removes waste from the resin when the resin reaches the bottom of the vessel (45, 50). The vessel outputs the waste removed from the resin via a waste outlet (80), a wedge-wire waste outlet, or both. The eductor (60) is equipped with a plenum (65) which redirects the resin to the top of the vessel (45, 50) where it may be recirculated back down towards and through the wedge-wire screen draw chamber. The electronic monitoring and control system of the present invention employs electronic sensors which monitor and respond to the current state of the chemical(s) (cleaning solution (15)) and resin as it circulates within the vessel. After cleaning, the resin is regenerated, and then rinsed using a diffusion-shifted displacement (90) final rinse process to achieve a specific predetermined state.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. An apparatus configured to clean and condition anion and cation resins comprising:
   a vessel; and;
   at least one eductor, said at least one eductor configured to transfer resins, recirculating the resin within the vessel through said at least one eductor.

2. The apparatus of claim 1, further comprising:
   a sulfite solution, said sulfite solution configured to perform a reducing reaction, converting to sulfate to clean resins prior to introduction of said at least one resin regeneration solution to said vessel.

3. The apparatus of claim 2, wherein said bottom has at least one sloped side for downward channeling of resins, at least one sulfite solution inlet, at least one waste outlet, at least one resin inlet, and at least one resin outlet; and
   wherein said sulfite solution is catalyzed and is configured to deconstruct and remove organic and metal oxide materials adhered to resin surfaces.

4. The apparatus of claim 2, further comprising:
   a separation screen, said separation screen disposed within said vessel.

5. The apparatus of claim 2, further comprising:
   at least one regeneration solution;
   an electronic monitoring and control system, said electronic monitoring and control system in communication with a data integrator having real-time monitoring capabilities, a programmable logic controller (PLC), and at least one sensor;
   wherein said at least one sensor is disposed on at least one interior side of said vessel; and
   wherein said electronic monitoring and control system includes at least one sensor configured to monitor and respond to the state of the resin, said sulfite solution, and said at least one resin regeneration solution as the resin, said at least one regeneration solution, and said sulfite solution recirculate within the vessel and through said at least one eductor.

6. The apparatus of claim 2, further comprising:
   at least one chemical regeneration solution, said at least one chemical regeneration solution tailored to clean and regenerate resin selected from the following group: cation resin, and anion resin.

7. The apparatus of claim 1, further comprising:
   an eductor discharge plenum, said eductor discharge plenum disposed in communication with said eductor to transport and clean resin.

* * * * *